A. J. BRADFORD.
DIRECTION INDICATOR.
APPLICATION FILED AUG. 8, 1918.
1,366,867.
Patented Jan. 25, 1921.
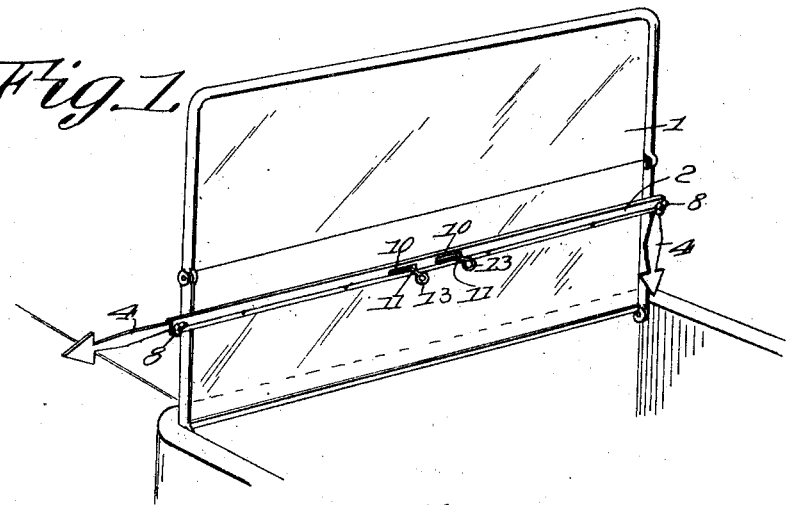
Fig. 1.
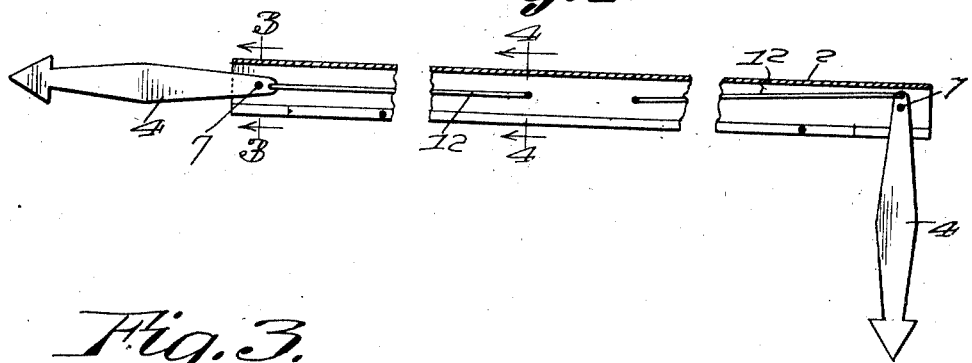
Fig. 2.
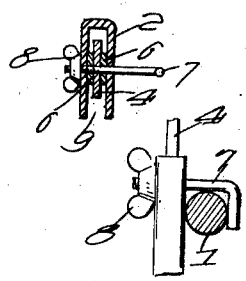
Fig. 3.
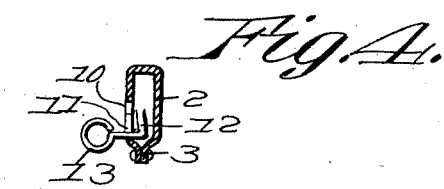
Fig. 4.
Fig. 5.
Inventor
Andrew J. Bradford,
By
Attorney

UNITED STATES PATENT OFFICE.

ANDREW J. BRADFORD, OF DENVER, COLORADO.

DIRECTION-INDICATOR.

1,366,867.　　　　　Specification of Letters Patent.　　Patented Jan. 25, 1921.

Application filed August 8, 1918. Serial No. 248,901.

*To all whom it may concern:*

Be it known that I, ANDREW J. BRADFORD, a citizen of the United States of America, residing at Denver, in the county of Denver and State of Colorado, have invented new and useful Improvements in Direction-Indicators, of which the following is a specification.

The invention seeks as its principal purpose the provision of a direction indicating device which may be readily attached to the windshield of an auto vehicle, so that only a simple operation is necessary to indicate to the drivers of other such vehicles the direction which the driver of the vehicle in question proposes to take.

A further purpose of the invention is to provide a device of this character which may be easily and cheaply manufactured, which is simple in construction and which effectively serves the purpose for which it is designed.

Still further and other purposes will be made apparent in the following detail description. As shown and described, but one embodiment of the invention has been adhered to, to which, however, it is not to be confined. Practical application may show certain desirable changes or alterations to be of advantage, and the right is claimed to make any which do not deviate from the scope of the appended claim.

In the accompanying drawings:

Figure 1 is a perspective view showing the application of the invention,

Fig. 2 is a longitudinal sectional view through the hollow body member of the device, Fig. 3 is a section on the line 3—3 of Fig. 2, Fig. 4 is a section on the line 4—4 of Fig. 2, Fig. 5 is a detail view looking at the top of the tubular member at one end and showing the frame of the windshield in section.

As illustrated, the device is shown applied to the windshield 1, which in this instance is presumed to be the windshield of a pleasure or touring car. The device comprises a hollow body member 2 which is of pronounced rectangular conformation in cross section. This body member 2 is of a length slightly in excess of the width of the windshield on which it is applied, and is formed preferably of sheet metal bent back on itself and provided with abutting flanges 3 which are riveted or otherwise attached together.

At each end of the body, there is carried a pointer or indicator 4 which, at the end remote from the arrows is formed with an eye in which there loosely engages the reduced portion 5 of a washer 6 whose thickness is equal to the thickness of the body between the inner faces of its side walls. The washer 6 operates as a spacer to prevent the body being compressed by the attaching means by which it is supported on the windshield. The attaching means comprise J bolts 7, the shanks of which pass through holes formed in the side walls of the body and through holes formed in the washers. The extreme end of the shank of each J bolt is threaded to receive a wing nut 8 so that when the hooked end of the J bolt engages the frame of the windshield and the wing nut is screwed down firmly against the body member, the latter is secured firmly in place on the windshield.

It is obvious that the body member may be made of tubing of the proper rectangular conformation in cross section so that the flanges 3 may be unnecessary. Such a construction as this will permit of the body being turned end for end without affecting the relative positions of the indicating members with respect to the windshield. This may be of advantage in certain instances and it is therefore desired to mention it here. If such a construction of body member were employed, the said body member would be slotted both on the top and bottom edges above and below the washers 6, so that the indicators would be permitted to assume depending positions if the body were turned end for end as suggested. In the present illustration, however, the body member is provided with slots only on the bottom edge, as indicated by the numeral 9, and these slots 9 are formed by so shaping the material of the body member that the flanges 3 directly below the washers 6 stand in spaced relation to each other, thus providing clearance spaces for the indicators when they assume depending positions, as they do when not in use.

It will be observed from the structure disclosed that relative large arrows are provided on the ends of the indicators, thus providing sufficient weight at the ends to permit the force of gravity to bring the indicators to depending position except when prevented from assuming such position by the operating means for the indicators about to be described.

In the body member and to either side of its longitudinal center and in that side wall opposite the one which lies against the windshield there are formed longitudinal slots 10 at whose ends adjacent the center of the body member there are formed downwardly directed recesses 11. Operating members 12 pivotally connect with the indicators 4 at the ends opposite the arrows and consequently on the opposite side of the washers 6 from which the arrows stand. These operating members extend longitudinally through the body and are formed at their free ends with right angled bends turned into loops which constitute the hand or finger grips 13. When the indicators are in the depending positions, the hand grips are adjacent those ends of the slots 10 which are opposite the recesses 11. To raise either indicator to the signaling position, it is only necessary to exert a pressure on the hand grip to force it along the slot 10 in the direction of the recess 11 and when it has reached the latter, the right angled portion on which it is formed drops in the said recess and thus secures the indicator in signaling position.

It is obvious that the indicators may be so formed that the ends which engage the washers 6 may be offset from those on which the arrows are formed and this arrangement will permit the signaling ends of the indicators to be carried in front of the windshield while the body and all the operating parts of the indicator are carried behind the said shield.

In the foregoing description and the accompanying drawings, it is believed that the construction and operation of the invention have been made apparent, and further description is therefore omitted.

The invention having been described, what is claimed as new and useful is:

In a direction indicator, a hollow body member of rectangular conformation in cross section, a pair of spacing washers inserted in each end of the body member between the side walls thereof, a J-bolt having its shank passed through the body member and through the spacing washers and having its extremity adapted for engagement with the frame of a windshield, indicators pivotally mounted on the shank of each J-bolt between the two of each pair of spacing washers, the body member being slotted on the lower edge below the indicators, and operating members pivotally connected with the indicators and provided with hand engaging portions projecting through slots formed in the body member adjacent its longitudinal center, whereby either indicator may be swung into a position in substantial alinement to the body member or allowed to assume a depending position, the J-bolts serving as the attaching means for the body member and the supporting means for the indicators.

In testimony whereof I affix my signature.

ANDREW. J. BRADFORD.